US005486028A

United States Patent [19]
Swain

[11] Patent Number: 5,486,028
[45] Date of Patent: Jan. 23, 1996

[54] SUBSTRATE HOLDING APPARATUS

[75] Inventor: Eugene A. Swain, Webster, N.Y.

[73] Assignee: Xerox Corporation, Stamford, Conn.

[21] Appl. No.: 304,443

[22] Filed: Sep. 12, 1994

[51] Int. Cl.⁶ ..................................................... B66C 1/54
[52] U.S. Cl. .............................................. 294/93; 294/100
[58] Field of Search ................................... 294/93, 94, 95, 294/96, 97, 98, 99.1, 100, 86.24, 86.25; 901/39; 269/47, 48.1

[56] References Cited

U.S. PATENT DOCUMENTS

| 441,721 | 12/1890 | Trumbore | 294/100 |
|---|---|---|---|
| 478,024 | 6/1892 | Rose | 294/93 |
| 2,568,210 | 9/1951 | Whitney | 294/100 |
| 3,314,714 | 4/1967 | Brubaker | 294/99.1 |
| 3,777,875 | 12/1973 | Sobran | 198/131 |
| 3,945,486 | 3/1976 | Cooper | 198/179 |
| 4,680,246 | 7/1987 | Aoki et al. | 430/133 |
| 4,718,188 | 1/1988 | Roberts | 43/4 |
| 4,783,108 | 11/1988 | Fukuyama et al. | 294/98.1 |

Primary Examiner—Dean Kramer
Attorney, Agent, or Firm—Zosan S. Soong

[57] ABSTRACT

There is disclosed a substrate holding apparatus comprising: (a) a member comprised of a top surface, a bottom surface, a center region and a plurality of segments disposed around and integral with the center region, the segments being defined by a plurality of slits in the member, wherein the segments bend and overlap when subjected to a compressive force, thereby decreasing the width of the member, and wherein the extent of bending and overlapping of the segments spontaneously decreases when the compressive force lessens, thereby increasing the width of the member; and (b) compressive force mechanism operatively associated with the member for controlling the amount of compressive force on the member.

14 Claims, 3 Drawing Sheets

FIG. 3
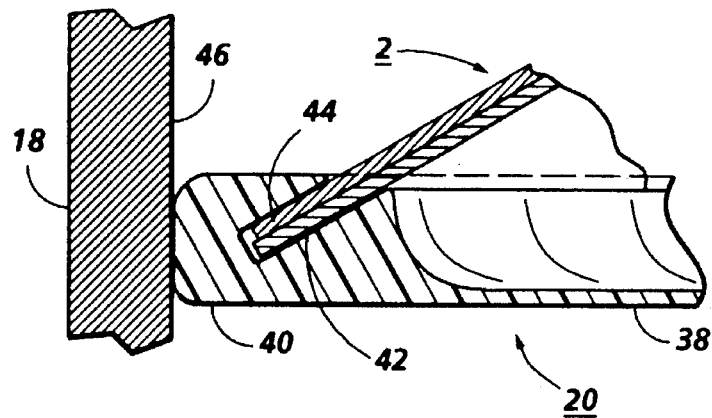
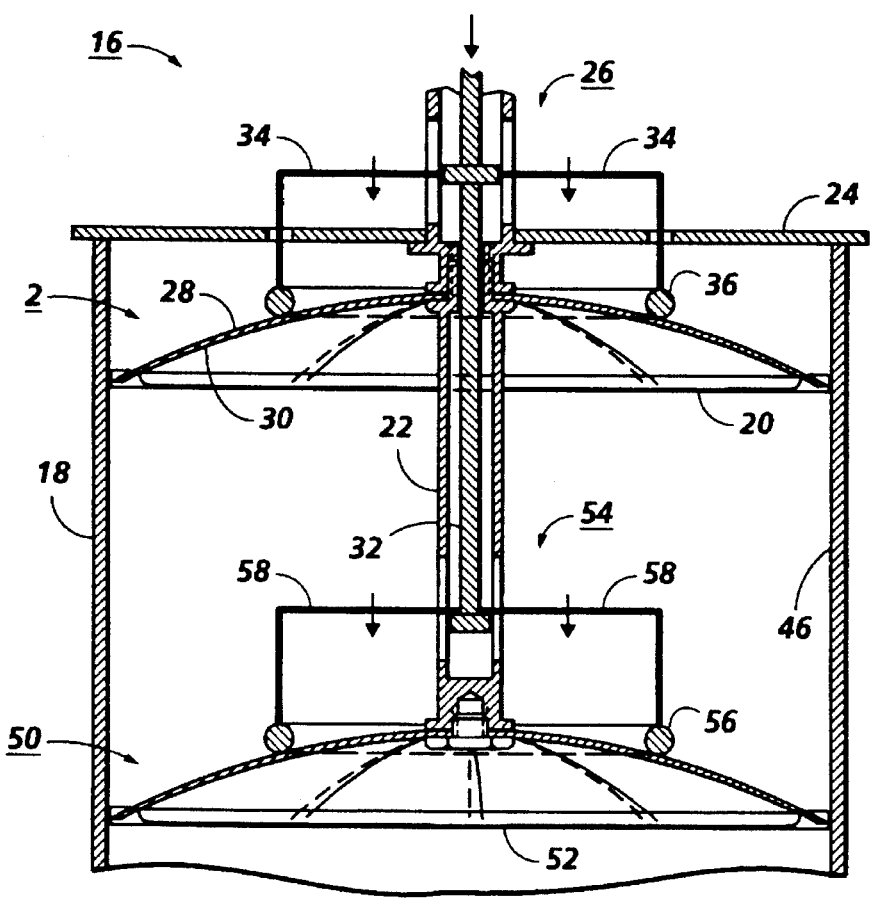
FIG. 4

SUBSTRATE HOLDING APPARATUS

This invention relates generally to an apparatus for internally holding a substrate such as a drum or a belt for processing.

Conventional substrate holding devices grip the insides of a hollow substrate by using for example an inflatable member. Known gripping devices are illustrated by the following documents, several of which disclose an inflatable member: Fukuyama et al., U.S. Pat. No. 4,783,108; Aoki et al., U.S. Pat. No. 4,680,246; Cooper, U.S. Pat. No. 3,945,486; and Sobran, U.S. Pat. No. 3: 777,875.

Roberts, U.S. Pat. No. 4,718,188, discloses an ice removal device which includes a collapsible basket comprised of a plurality of flexible vanes mounted on the end of a rod and a sleeve slidably mounted on the rod having an expander disk mounted thereto for expanding and contracting the basket to adjust to ice fishing holes of various diameters.

There is a need, which the present invention addresses, for new apparatus for internally gripping a hollow substrate which is simple and economical to implement.

SUMMARY OF THE INVENTION

It is an object of the invention in embodiments to provide a new apparatus for internally gripping a hollow substrate which is simple and economical to implement.

This object and others are accomplished in embodiments by providing a substrate holding apparatus comprising:

(a) a member comprised of a top surface, a bottom surface, a center region and a plurality of segments disposed around and integral with the center region, the segments being defined by a plurality of slits in the member, wherein the segments bend and overlap when subjected to a compressive force, thereby decreasing the width of the member, and wherein the extent of bending and overlapping of the segments spontaneously decreases when the compressive force lessens, thereby increasing the width of the member; and (b) compressive force means operatively associated with the member for controlling the amount of compressive force on the member.

There is as provided in embodiments of the instant invention an apparatus further comprising:

(c) a support shaft operatively associated with the member;

(d) a second member, operatively associated with the shaft and disposed below the bottom surface of the member, comprised of a top surface, a bottom surface, a center region and a plurality of segments disposed around and integral with the center region, the segments being defined by a plurality of sits in the second member, wherein the segments bend and overlap when subjected to a compressive force, thereby decreasing the width of the second member, and wherein the extent of bending and overlapping of the segments spontaneously decreases when the compressive force lessens, thereby increasing the width of the second member; and (e) second compressive force means operatively associated with the second member for controlling the amount of compressive force on the second member.

BRIEF DESCRIPTION OF THE DRAWINGS

Other aspects of the present invention will become apparent as the following description proceeds and upon reference to the Figures which represent preferred embodiments and are substantially to scale:

FIG. 3 represents a schematic, side cross-sectional view of the coupling of the covering and the member and their engagement with the inner surface of the substrate;

FIG. 4 represents a schematic, side cross-sectional view of the holding apparatus comprised of two members and two compressive force means.

Unless otherwise noted, the same reference numeral in the Figures refers to the same, or similar feature.

DETAILED DESCRIPTION

Figure 1:
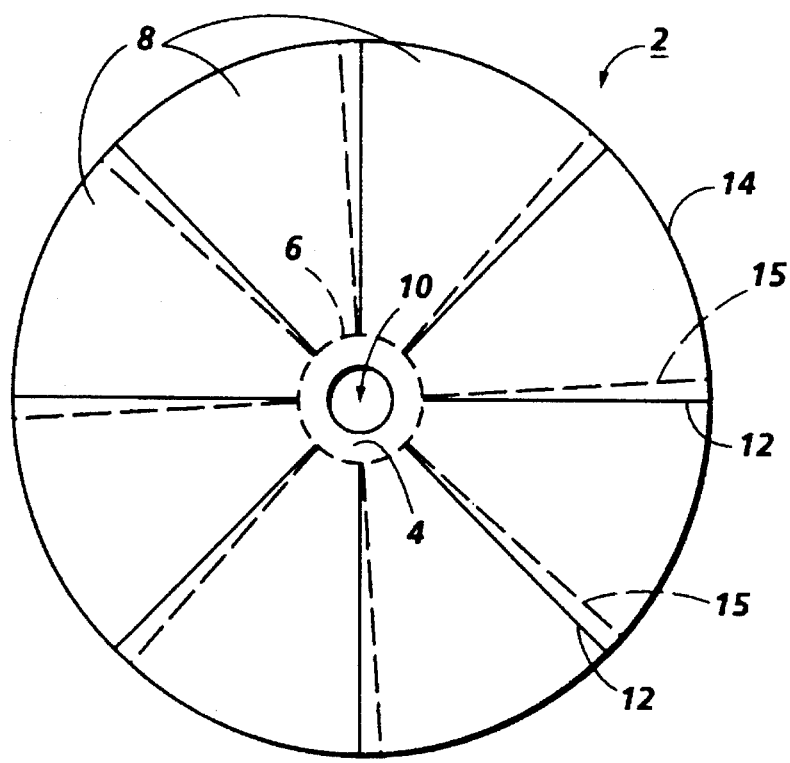
FIG. 1 represents a schematic top view of the member, a component of the holding apparatus.

FIG. 1 represents a top view of the top surface of a member 2. Member 2 comprises a center region 4 (indicated by the imaginary line 6) and a plurality of segments 8 which are disposed around and are integral with the center region 4. The center region 4 may define an opening 10 to accommodate for example a support shaft (shown in FIG. 2). The segments may be disposed around the center region in a radial pattern. The number of segments may range for example from 6 to 48, preferably 8 to 10, and especially 8. The segments are defined by a plurality of slits 12 in the member 2, which may extend in a radial pattern from the edge 14 of the member towards the center region 4. The number of slits may range for example from 6 to 48, preferably 8 to 10, and especially 8. Each slit may be narrow and has a width ranging in size for example from about 0.1 mm to about 1 mm, and preferably from about 0.2 mm to about 0.5 mm. The slits 12 extend through the member 2 from the edge 14 of the member along a portion of the width of the member to allow adjacent segments to overlap when the member is subjected to a compressive force which deforms the member into for example a dish shape. In FIG. 1, the member is in the form of a dish shape or dome wherein adjacent segments overlap (indicated by the hidden lines 15). The length of each slit may range for example from about ⅓ to about ½ the width of the member.

The member 2, when planar, may be generally disk shaped. The phrase "generally disk shaped" means that the member is thin and may have a round, oval, or oblong shape. The member 2 may be fabricated from a resilient material including a plastic or a metal such as aluminum, spring steel, beryllium copper, stainless steel or nickel. Preferably, the slits (to define the segments) are made on a single piece of material, thereby resulting in a single piece member. A spring material like spring steel is preferred. In embodiments of the invention, the segments may be individual pieces which are coupled to the center region by any suitable technique and apparatus including for example a fastening device such as by a staple, screw, rivet, and the like, welding, and/or an adhesive or clamping mechanism.

Figure 2:
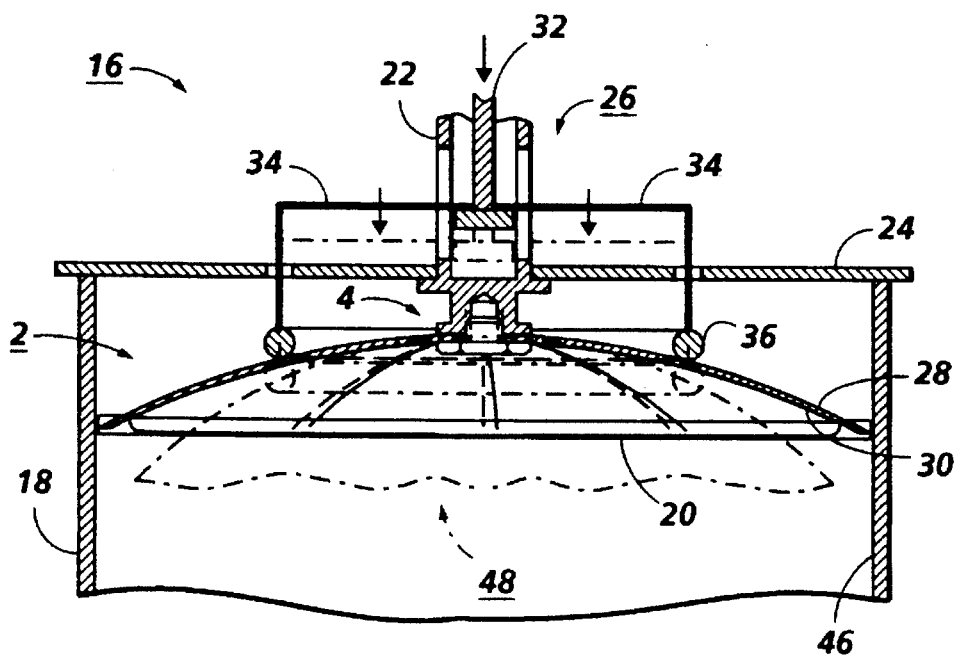
FIG. 2 represents a schematic, side cross-sectional view of the holding apparatus disposed in a substrate in both a "compressed" state and an "expanded" state.

In FIG. 2, the substrate holding apparatus 16 is disposed in a hollow substrate 18 where apparatus 16 comprises a member 2, an optional flexible covering 20, a support shaft 22, a plate 24, and a compressive force means 26. Member 2 comprises a top surface 28 (composed of the top surfaces of the segments and the center region), a bottom surface 30

(composed of the bottom surfaces of the segments and the center region), a center region 4, and a plurality of segments 8. In FIG. 2, member 2 is curved into a dish shape or dome shape where the top surface may be convex and the bottom surface may be concave.

Covering 20 is coupled to the edge portion of the member along for example the entire perimeter of the member and extends across the bottom surface of the member. Preferably, the covering together with the member provides a hermetic seal to minimize or prevent fluid from coating the bottom surface of the member and from coating the inside of the substrate. The shape of the covering may correspond to that of the member and preferably is round, oval, or oblong. The covering may be fabricated from any suitable material such as silicone rubber and other elastomers, especially a fluoroelastomer like VITON™. The covering may be flexible to facilitate changes in the curvature of the member. The covering may have an effective thickness ranging for example from about 0.1 mm to about 10 mm, and preferably from about 0.2 mm to about 1.0 mm.

Support shaft 22 is coupled to the center region of the member by employing for example welding, a fastening device, and/or an adhesive, and the like. In embodiments, the shaft 22 extends through the optional opening 10 in the center region 4. In embodiments, there is no opening in the center region and the end of the shaft is coupled to the center region by the method described herein. The shaft may be solid or hollow. The shaft 22 is rigidly coupled to a plate 24 at preferably a right angle at a position on the shaft above the top surface 28 of the member. The plate 24 contacts an end of the substrate to maintain the orientation of the holding apparatus 16 during its engagement with the substrate.

The compressive force means 26 comprises any apparatus which can control the amount of compressive force exerted on the member, especially its top surface, such compressive force deforming the member into a dish shape. The compressive force means 26 comprises for example a cylinder 32, a plurality of arms 34, and a ring 36. The cylinder 32 may be disposed inside the shaft 22, and the cylinder may be movable in the up and down directions. A plurality of arms 34 such as two, three, four, or more, is coupled to the cylinder 32. FIG. 2 depicts a pair of arms 34 disposed directly opposite one another. There are openings of an appropriate size and shape in the plate 24 and the shaft 22 to allow passage and movement of the arms. The ring 36 engages the top surface of the member and preferably is rigid. Each arm 34 is coupled to the cylinder 32. In embodiments of the invention, the compressive force means may comprise a hollow cylinder which is concentric with but disposed externally around the shaft; the cylinder is is movable in the up and down directions and is coupled to the plurality of arms.

FIG. 3 illustrates in more detail coupling of the covering 20 to the edge portion 44 of the member 2 and engagement of the holding apparatus with the substrate 18. Covering 20 is comprised of a flexible membrane portion 38 and an integral outer bead portion 40 which defines a groove 42 for engagement with the edge portion 44 of the member. Groove 42 extends around the perimeter of the covering. The outer bead portion 40 may be a thickened extension of the membrane 38. As seen in FIG. 3, the member 2 urges an edge of the outer bead portion 40 against the substrate inner surface 46.

Operation of the holding apparatus 16 is as follows (refer for example to FIG. 2). Prior to engagement with a substrate, the compressive force means 26 is activated to create a compressive force on the top surface of the member to deform the member into a dish shape. The compressive force means may be activated by for example moving downwards cylinder 32 which transmits a compressive force to the member through the movement downwards of the coupled arms 34 and ring 36. The segments 8 bend and overlap under the compressive force, thereby resulting in a decrease in the width of the member. The covering 20 wrinkles when the width of the member decreases. The compressive force is sufficiently large to decrease the width of the member to less than the width of the substrate to allow insertion of the member and covering into the substrate. The phantom lines 48 in FIG. 2 indicate the member 2 and the covering 20 in the "compressed" state. The compressive force on the member is then lessened by for example moving the compressive force means away from the member. For instance, cylinder 32 may be moved upwards which causes the coupled arms 34 and ring 36 to move upwards, thereby reducing the compression force on the member. When the compression force is reduced, the extent of bending and overlapping of the segments spontaneously decreases due to the resilient nature of the segments, thereby increasing the width of the member. The member and the coupled covering expand with a reactive force in the direction of expansion until the covering contacts the inner surface, 46 of the substrate. In this "expanded" state, the covering and the member press against the substrate inner surface 46, thereby resulting in the holding apparatus gripping the substrate. In this "expanded" state, the member has a dish shape which has a lesser curvature than in the "compressed" state. After processing of the substrate, the compression force on the member is increased as described herein to decrease the width of the member, thereby allowing the withdrawal of the holding apparatus from the substrate. In an embodiment of the invention, covering 20 is deleted from the holding apparatus and the edge portion of the member contacts the substrate inner surface to hold the substrate.

FIG. 4 illustrates an embodiment where the holding apparatus 16 includes a second member 50, a second covering 52 and a second compressive force meads 54 adjacent the other end of the substrate, wherein these components may have the same or similar function, operation, configuration and materials as the member 2, the covering 20, and the compressive force means 26 described herein. In FIG. 4, shaft 22 extends further down to couple to the second member 50. The second covering 52 couples to the second member 50 in the same or similar manner as the covering 20 couples to the member 2. The second compressive force means 54 may comprise .or example a second ring 56 coupled to a second plurality of arms 58 which is in turn coupled to the cylinder 32 which also may be a component of the compressive force means (26, 54). In this embodiment, movement of the cylinder 32 up or down simultaneously affects the amount of compressive force applied on the members (2, 50). In FIG. 4, the covering 20 is desired since it will provide the hermetic seal against fluid migration into the interior of the substrate 18. Covering 52 is optional. Covering 20 in FIG. 4 may have an opening to accommodate the shaft 22.

Any suitable rigid or flexible substrate may be held by the substrate holding apparatus of the present invention. The substrate may have a cylindrical cross-sectional shape or a noncylindrical cross-sectional shape such as an oval shape. The substrate may be at least partially hollow, and preferably entirely hollow, with one or both ends being open. In preferred embodiments, the substrate is involved in the fabrication of photoreceptors and may be bare or coated with layers such as photosensitive layers typically found in photoreceptors. The substrate may have any suitable dimensions. A major advantage of this holding apparatus is that it embodies very low mass and therefore will not cause excessive heat flow from a thin substrate to the holding apparatus when placed in an oven.

Figure 5:
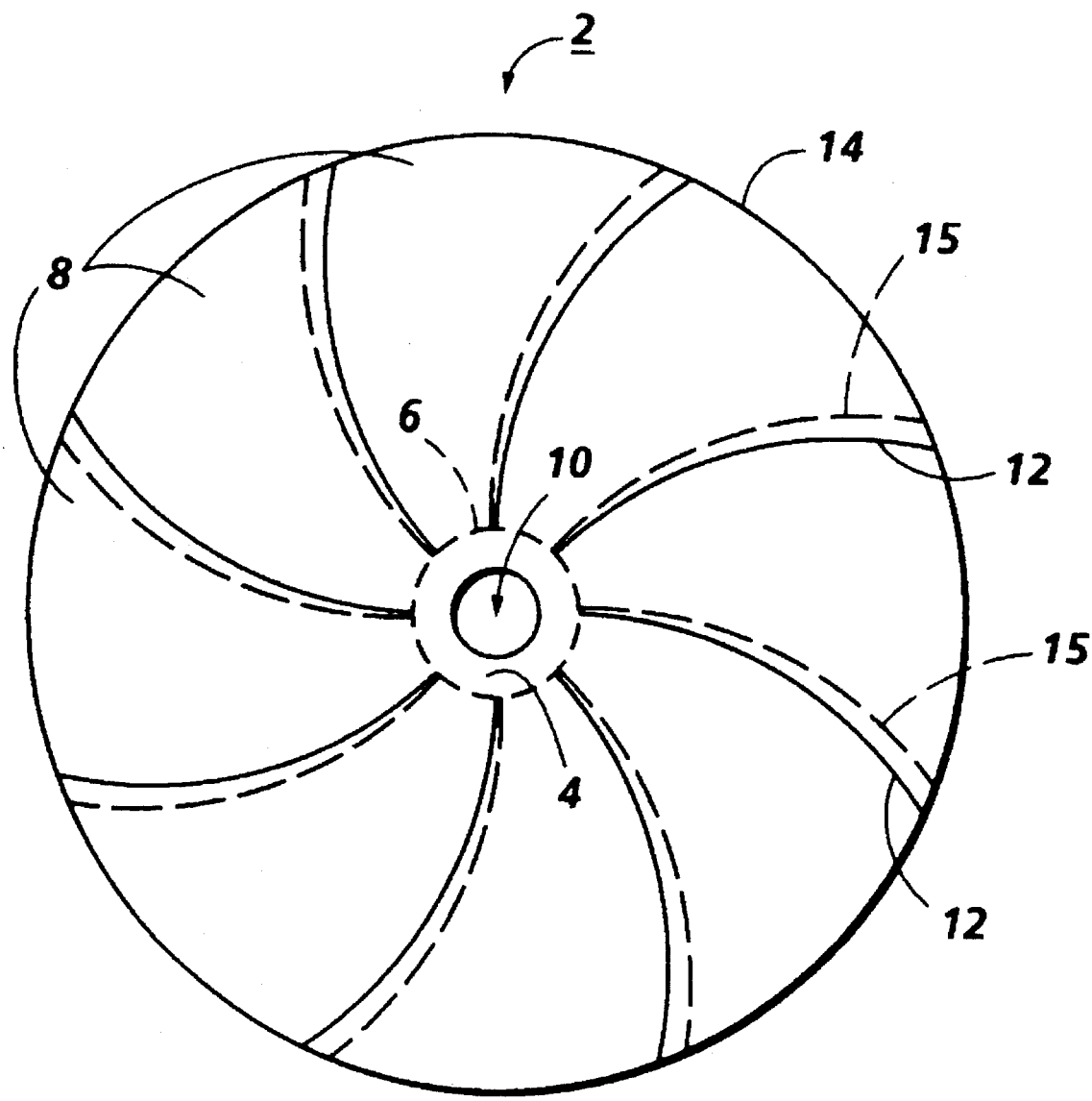
FIG. 5 represents a schematic top view of an alternative configuration of a member having curved slits.

FIG. 5 illustrates an alternative member 2 where the slits 12 and segments 8 are curved. The member 2 of FIG. 5 functions in a manner similar to the member 2 of FIG. 1. Hidden lines 15 indicate overlapping of segments 8. Imaginary line 6 defines the center region 4. Optional opening 10 may be present in the center region 4.

Other modifications of the present invention may occur to those skilled in the art based upon a reading of the present disclosure and these modifications are intended to be included within the scope of the present invention.

I claim:

1. A substrate holding apparatus comprising:
   (a) a member comprised of a top surface, a bottom surface, a center region and a plurality of segments disposed around and integral with the center region, the segments being defined by a plurality of slits in the member, wherein the segments bend and overlap when subjected to a compressive force, thereby decreasing the width of the member, and wherein the extent of bending and overlapping of the segments spontaneously decreases when the compressive force lessens, thereby increasing the width of the member; and
   (b) compressive force means operatively associated with the member for controlling the amount of compressive force on the member.

2. The apparatus of claim 1, wherein the compressive force means deforms the member into a dish shape.

3. The apparatus of claim 1, further comprising a supporting shaft operatively associated with the member.

4. The apparatus of claim 1, wherein the member is fabricated from a resilient material.

5. The apparatus of claim 1, wherein the member is fabricated from spring steel, beryllium copper, aluminum, stainless steel or nickel.

6. The apparatus of claim 1, wherein the member is a single piece.

7. The apparatus of claim 1, wherein the slits radially extend from the edge of the member towards the center region.

8. The apparatus of claim 1, wherein the number of segments ranges from 6 to 48.

9. The apparatus of claim 1, wherein the member, when planar, is disk shaped.

10. The apparatus of claim 1, further comprising a flexible covering coupled to the edge portion of the member.

11. The apparatus of claim 10, wherein the covering comprises a membrane portion and an integral outer bead portion defining a groove.

12. The apparatus of claim 1, wherein the compressive force means comprises a rigid ring engaged with the top surface of the member, wherein the ring is operatively associated with a movable cylinder.

13. The apparatus of claim 1, wherein the slits are curved.

14. The apparatus of claim 1, further comprising:
   (c) a support shaft operatively associated with the member;
   (d) a second member, operatively associated with the shaft and disposed below the bottom surface of the member, comprised of a top surface, a bottom surface, a center region and a plurality of segments disposed around and integral with the center region, the segments being defined by a plurality of slits in the second member, wherein the segments bend and overlap when subjected to a compressive force, thereby decreasing the width of the second member, and wherein the extent of bending and overlapping of the segments spontaneously decreases when the compressive force lessens, thereby increasing the width of the second member; and
   (e) second compressive force means operatively associated with the second member for controlling the amount of compressive force on the second member.

* * * * *